United States Patent [19]

Elvin et al.

[11] Patent Number: 4,800,185

[45] Date of Patent: Jan. 24, 1989

[54] REGENERAATION OF METAL CONTAMINATED HYDROCARBON CONVERSION CATALYTSTS

[75] Inventors: Frank J. Elvin, Kenner, La.; Jan-Erik Otterstedt, Surte, Sweden; Jin S. Yoo, Flossmoor, Ill.

[73] Assignee: ChemCat Corporation, New Orleans, La.

[21] Appl. No.: 90,645

[22] Filed: Aug. 28, 1987

Related U.S. Application Data

[63] Continuation of Ser. No. 895,130, Aug. 11, 1986, abandoned.

[51] Int. Cl.$^4$ .................. B01J 38/66; B01J 38/64; B01J 29/38; C10G 11/05
[52] U.S. Cl. .................. 502/26; 208/52 CT; 208/120; 502/25; 502/516
[58] Field of Search .................. 502/25, 26, 516; 208/52 CT, 120

[56] References Cited

U.S. PATENT DOCUMENTS

| | | | |
|---|---|---|---|
| 3,684,738 | 8/1972 | Chen | 502/26 |
| 3,957,623 | 5/1976 | McDaniel et al. | 208/120 |
| 4,055,482 | 10/1977 | Robson | 502/26 |
| 4,101,444 | 7/1978 | Burk et al. | 502/26 |
| 4,102,811 | 7/1978 | Burk et al. | 502/25 |
| 4,163,709 | 7/1979 | Burk et al. | 208/120 |
| 4,234,452 | 11/1980 | Burk, Jr. et al. | 502/516 |
| 4,243,550 | 1/1981 | Burk et al. | 502/516 |
| 4,268,376 | 5/1981 | Foster | 502/25 |

*Primary Examiner*—Paul E. Konopka
*Attorney, Agent, or Firm*—Frank J. Uxa

[57] ABSTRACT

A process for treating a catalyst contaminated with at least one metal which was so contaminated while promoting conversion of a substantially hydrocarbon feedstock containing the metal comprising at least one of the following: (1) contacting the catalyst component to increase the ammonium ion-containing component to increase the ammonium ion content of the catalyst; and (2) contacting the catalyst with at least one rare earth metal ion-containing component to increase the rare earth metal ion content of the catalyst. Improved hydrocarbon conversion processes are also disclosed.

17 Claims, No Drawings

REGENERAATION OF METAL CONTAMINATED HYDROCARBON CONVERSION CATALYTSTS

RELATED APPLICATION

This application is a continuation of application Ser. No. 895,130 filed Aug. 11, 1986, now abandoned.

The present invention relates to improved treatment of catalyst which is contaminated by one or more metals in hydrocarbon conversion service. More particularly, the invention relates to such an improved catalyst treating process which involves contacting the catalyst with at least one of certain ions, and to an improved hydrocarbon conversion process utilizing such treated catalyst.

Catalytically promoted processes for the chemical conversion of hydrocarbons include cracking, hydrocracking, reforming, hydrodenitrogenation, hydrodesulfurization, etc. Such reactions generally are performed at elevated temperatures, for example, about 300 degrees F. to 1200 degrees F., more often about 600 degrees F. to about 1000 degrees F. Feedstocks to these processes comprise normally liquid and solid hydrocarbons which, at the temperature of the conversion reaction, are generally in the fluid, i.e., liquid or vapor, state and the products of the conversion usually are more valuable, e.g., lower boiling, materials.

In particular, cracking of hydrocarbon feedstocks to produce hydrocarbons of preferred octane rating boiling in the gasoline range is widely practiced and uses a variety of solid catalysts to give more valuable end products. Cracking is ordinarily effected to produce gasoline as the most valuable product and is generally conducted at temperatures of about 750 degrees F. to about 1100 degrees F., preferably about 850 degrees F. to about 950 degrees F., at pressures up to about 2000 psig., preferably about atmospheric to about 100 psig. and without substantial addition of free hydrogen to the system. In cracking, the feedstock is usually a petroleum hydrocarbon fraction such as straight run or recycle gas oils or other normally liquid hydrocarbons boiling above the gasoline range.

The present invention relates to the improvement of catalyst performance in hydrocarbon conversion where metal contamination, i.e., poisoning occurs. Although referred to as "metals", these catalyst contaminants may be present in the hydrocarbon feed in the form of free metals or relatively non-volatile metal compounds. It is, therefore, to be understood that the term "metal" as used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present in petroleum stocks, including some iron, petroleum stocks also have a tendency to pick up tramp iron from transportation, storage and processing equipment. Most of these metals, when present in a stock, deposit in a relatively non-volatile form on the catalyst during the conversion process so that regeneration of the catalyst to remove deposited coke does not also remove these contaminants.

Typical crudes which are contaminated with metals and some average amounts of metal are: North slope, 11 ppm nickel, 33 ppm vanadium; Lagomedio (Venezuelan), 12 ppm nickel, 116 vanadium; light Iranian, 16 ppm nickel, 44 ppm vanadium; heavy Iranian, 30 ppm nickel, 22 ppm vanadium. In general, a crude oil can contain from about 5 to 500 ppm nickel and from about 5 to 1500 ppm vanadium. Moreover, since the metals tend to remain behind during processing, the bottoms of typical feeds will have an amount of metals two, three, four times or more than the original crude. For example, reduced crude or residual stocks can have vanadium levels as high as 1000–2000 ppm. Typical residual stocks and their vanadium level include: Sag River atmospheric residuum, 48 ppm vanadium; heavy Iranian atmospheric residuum, 289 ppm vanadium; Canadian tar sand bitument, 299 ppm vanadium; Tia Juana Vacuum residuum, 570 ppm vanadium; and Orinoco Heavy Crude, 1200 ppm vanadium. The higher the metal level in the feed, the more quickly a given catalyst will be poisoned and consequently the more often or more effective the demetallization of that catalyst must be.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate on the catalyst and, since they affect process performance, are also referred to as "poisons". A poisoned catalyst with these metals generally produces a higher yield of coke and hydrogen at the expense of desired products, such as gasoline, fuel oils and butanes. For instance, U.S. Pat. No. 3,147,228 reports that it has been shown that the yield of butanes, butylenes and gasoline, based on converting 60 volume percent of cracking feed to lighter materials and coke dropped from 58.5 to 49.6 volume percent when the amount of nickel on the catalyst increased from 55 ppm to 645 ppm and the amount of vanadium increased from 145 ppm to 1480 ppm in a fluid catalytic cracking of a feedstock containing some metal contaminated stocks. Since any cracking units are limited by coke burning or gas handling facilities, increased coke or gas yields require a reduction in conversion or throughout to stay within the unit capacity.

Many patents have issued disclosing various approaches to removing metals from hydrocarbon conversion catalysts and then returning the catalyst to hydrocarbon conversion service. Certain of these patents involve chlorinating metal contaminated alumina, silica-alumina and silica catalysts at elevated temperatures. See, for example, U.S. Pat. Nos. 3,150,104; 3,122,510; 3,219,586; and 3,182,025 each of which is hereby incorporated in its entirety herein by reference. In certain instances, prior patents have taught the use of liquid aqueous compositions containing ammonium ion to remove vanadium from the oxide-based catalyst and/or to at least partially neutralize the chlorine and/or hydrogen chloride which exists with the chlorinated, oxide-based catalyst.

In the more recent past, other demetallization processes have been suggested which do not primarily involve chlorinating of the catalyst. See, for example, U.S. Pat. Nos. 4,101,444; 4,163,709; 4,163,710; 4,243,550 and related patents. These newer processes seek to effectively demetallize the newer, zeolite-containing catalysts while eliminating the use and handling of chlorinating agents and chlorinated catalyst which are often corrosive, particularly at elevated temperatures. These relatively less severe demetallization processes were also thought to be less likely to detrimentally affect the relatively fragile zeolite-containing catalysts.

In commonly assigned, pending U.S. patent application Ser. No. 881,334, a demetallization process involving chlorinating a synthetic crystalline material-containing catalyst is disclosed. This application teaches contacting the chlorinated catalyst with a liquid aqueous composition substantially free of ammonium ions to provide a demetallized catalyst with improved catalytic activity. This application is hereby incorporated in its entirety herein by reference. Certain of the above-noted patents and applications teach subjecting metal contaminated catalysts to one or more reductive/oxidative washes to improve catalyst performance. In particular, see U.S. Pat. No. 4,101,444 which is hereby incorporated in its entirety herein by reference.

In spite of the substantial amount of post work, there still remains a need for a still further improved process to advantageously affect at least one of the catalytic properties of metal contaminated, hydrocarbon conversion catalysts.

Therefore, one object of the present invention is to provide an improved process for treating a metal contaminated, hydrocarbon conversion catalyst.

A further object of the invention is to provide an improved process for demetallizing a metal contaminated, solid composition capable of promoting hydrocarbon conversion.

Another object of the present invention is to provide an improved hydrocarbon conversion process utilizing as at least a portion of the catalyst a treated catalyst.

A still further object of the invention is to provide an improved hydrocarbon conversion process utilizing as at least a portion of the catalyst a demetallized catalyst. Other objects and advantages of the present invention will become apparent hereinafter.

A process for treating a catalyst, capable of promoting hydrocarbon conversion, contaminated with at least one contaminant metal while promoting hydrocarbon conversion of a substantially hydrocarbon feedstock containing the contaminant metal or metals has been discovered. In one broad aspect, the present treating process comprises at least one, and preferably only one, of the following: (1) contacting the catalyst with at least one ammonium ion-containing component to increase the ammonium ion content of the catalyst and contacting the catalyst, preferably after the above-noted ammonium ion contacting, with at least one rare earth metal ion-containing component to increase the rare earth metal ion content of the catalyst; and (2) contacting the catalyst with at least one rare earth metal ion-containing component to increase the rare earth metal ion content of the catalyst. In another broad aspect, the catalyst comprises at least one synthetic crystalline material capable of promoting the hydrocarbon conversion and the treating process comprises at least one, preferably both, of the following: (1) contacting the catalyst with at least one ammonium ion-containing component to increase the ammonium ion content of the catalyst; and (2) contacting the catalyst with at least one rare earth metal ion-containing component to increase the rare earth metal ion content of the catalyst.

The present invention provides substantial and surprising benefits. For example, at least one advantageous catalytic property, e.g., catalytic activity, catalytic activity stability, catalytic selectivity to desired products and the like, is improved in the catalysts treated in accordance with the present invention relative to the untreated material. Further, the present contacting or contactings can often be conducted simply and inexpensively, thus providing a relatively easy to operate and cost effective approach to improve catalytic performance.

Without limiting the scope of the invention to any theory or theories of operation, the present contacting steps appear to reduce the content of at least one of the contaminant metals on the catalyst and/or reduce the proton content of the catalyst. Reducing the contaminant metal content and/or proton content of the catalyst improves at least one catalytic property of the catalyst. In addition, increasing the rare earth metal ion content of the catalyst preferably acts to improve at least one catalytic property of the catalyst. Preferably each of the contactings of the present treating process is carried out at conditions effective to ion exchange ammonium ions and/or rare earth metal ions onto the catalyst. Such ion exchange is particularly useful when the catalyst comprises at lease one of the above-noted synthetic crystalline materials.

In one embodiment, the metal contaminated catalyst is subjected to demetallization prior to steps (1) and/or (2) to reduce the amount of at least one contaminant metals on the catalyst. Such demetallization may include any step or combination of steps which act to produce a catalyst having a reduced content of at least one contaminant metal. For example, such demetallization may include at least one of the following: oxidizing the catalyst, chlorinating the catalyst, sulfiding the catalyst, water washing the catalyst, subjecting the catalyst to reductive/oxidative washes, and the like. A number of these demetallizing steps are described in more detail hereinafter. In any event, after demetallization to reduce contaminant metal content, the present treating process provides outstanding benefits. In this embodiment, the above-noted contacting or contactings can be considered as a process to further improve at least one catalytic property of the catalyst. The present contacting or contactings after demetallization may remove further amounts of one or more contaminant metals and/or increase the amounts of one or more ions on the catalysts which act to improve the catalytic effectiveness of the catalysts.

As noted above, in certain embodiments of the present invention, the catalyst is contacted with at least one ammonium ion-containing component to increase the ammonium ion content of the catalyst. Although the specific conditions of this contacting may vary widely, this contacting is preferably carried out at conditions effective to ion exchange ammonium ions onto the catalyst. Preferably, the ions which are exchanged for the ammonium ions include protons, ions of one or more of the contaminant metals and mixtures thereof. Ions which are particularly susceptible to being exchanged with ammonium ions include protons, alkali metal ions, vanadium ions and mixtures thereof.

The conditions for the ammonium ion catalyst contacting should, of course, be chosen so that the physical and chemical structure and make-up of the catalyst is not unduly, detrimentally affected. In one embodiment, the catalyst is contacted with a medium containing ammonium ions, preferably at a pH in the range of about 4 to about 7, more preferably about 4 to about 6.

The medium, preferably an aqueous medium, is preferably substantially free, before contact with the catalyst, of any contaminant materials which would remain deposited on the catalyst. Such contaminant materials include the alkali metals, as well as the other contaminant metals. The ammonium ions may be $NH_4+$ ions or organic-substituted $NH_4+$ ions such as methyl ammonium and quartenary hydrocarbon radical ammoniums. The contact material containing ammonium can be prepared by addition of a dry reagent or a concentrated solution of the reagent to water, preferably distilled or deionized water.

The reagent may be any water-soluble organic or inorganic ammonium compound such as ammonium carbonate, sulfate, nitrate, chloride, fluoride, citrate, tartarate, acetate and the like. An aqueous solution of such ammonium salts is highly preferred. The selected solute is preferably one which dissociates or ionizes in the aqueous medium and which can be washed away or which vaporizes or decomposes to vaporizable materials under catalyst regeneration or similar high temperature treatment.

The amount of ammonium ion in the medium is sufficient to give the desired increase in ammonium ion, preferably exchanged ammonium ion, content of the catalyst. In one embodiment, the maximum level of ammonium ion exchange depends on, for example, the pH level of ammonium ion-contaianing medium, concentration of ammonium ion and surface properties, e.g., surface area, and number of ion exchangeable sites, of the catalyst. Preferably, the amount of ammonium ion exchanged is in the range of about 1 to 500 or more pounds per ton of catalyst treated. About 10 to about 300 pounds is the more preferred ammonium ion concentration range. The temperature of this contacting may vary within wide limits. The preferred aqueous medium may be at room temperature or below, or may be higher. The temperature, of course, should not be so high and the contact should not be so long as to seriously harm the catalyst. The time of contact also may vary within wide limits, so long as thorough contact between the catalyst and the medium is assured. Very short contact times, for example, about 10 to about 30 minutes, may be satisfactory, while the time of contacting may last about 2 to about 5 hours or longer. Contacting pressure may vary widely. Preferably the pressure is in the range of about 0.1 atmospheres to about 30 or more atmospheres. Performing this contacting at about atmospheric pressure provides acceptable results. Such ammonium ion contacting, e.g., ion exchange, can be performed as a batch, semi-continuous or continuous operation in a column or other vessel.

In the event ion exchange is desired during the ammonium ion/catalyst contacting, any one of many well known ion exchange procedures or techniques may be utilized. Such ion exchange is preferred. The ion exchange medium and conditions should be chosen to avoid unduly harming the catalyst. Temperature, pressure, pH and contact time conditions are preferably similar to those identified above. Care should be taken to avoid undue problems in separating the catalyst from the ion exchange medium. The catalyst is brought into contact with the ion exchange medium to effect the desired ion exchange. Any suitable ion exchange medium may be employed. Preferably, the ion exchange medium comprises an aqueous solution containing ammonium ions adapted to exchange ammonium ions for ions on the catalyst.

After tha ammonium ion/catalyst contacting, the catalyst can be filtered and then slurried with water or rinsed in other ways, such as, for example, by a water wash on the filter, and the rinsing may be repeated, if desired, several times. A repetition of the ammonium ion/catalyst contacting without other treatments appears to have little beneficial effect if the first such contacting is properly, e.g., thoroughly, conducted.

If desired, the ammonium ion contacted catalyst may be dried. This dried solid composition can be placed directly into hydrocarbon conversion service or can be calcined, preferably in air at a temperature of about 500 degrees F. to about 1500 degrees F. for a time of about 0.1 hours to about 12 hours or more, and then placed into hydrocarbon conversion service. The ammonium ion contacted catalyst need not be dried or calcined prior to being subjected to contacting with rare earth metal ion.

In certain embodiments of the present invention, the catalyst, either without prior ammonium ion contacting or after ammonium ion contacting, e.g., as described above, is contacted with at least one rare earth metal ion-containing component to increase the amount of rare earth metal ion on the catalyst. Although the specific conditions of this contacting may vary widely, this contacting is preferably carried out at conditions effective to ion exchange rare earth metal ions onto the catalyst. Preferably, the ions which are exchanged for the rare earth metal ions include protons, ammonium ions, ions of one or more of the contaminant metals and mixtures thereof. Any one of any mixture of the lanthanide series of metals may be employed as the rare earth metal. Cerium, lanthanum and mixtures thereof are preferred. Cerium is a more preferred rare earth metal.

The conditions for the rare earth metal ion/catalyst contacting should, of course, be chosen so that the physical and chemical structure and make-up of the catalyst is not unduly, detrimentally affected. In one embodiment, the catalyst is contacted with a medium, preferably an aqueous medium, containing rare earth metal ions, preferably at a pH in the range of about less than 1 to about 5, more preferably about 2 to about 4. The medium is preferably substantially free, before contact with the catalyst, of any contaminant materials, e.g., as defined above, which would remain deposited on the catalyst. The rare earth metal ions can be derived from the solution of water soluble inorganic or organic rare earth metal salts, for example, halides, sulfates, nitrates, acetates and the like, The contact material containing rare earth metal ions can be prepared by addition of a dry reagent or a concentrated solution of the reagent in water, preferably distilled or deionized water.

The amount of rare earth metal ion contacted with the catalyst may vary over a wide range depending, for example, on the desired final concentration of rare earth metal on the catalyst after the treating process of the present invention. Preferably, the concentration of rare earth metal on the catalyst is increased by an amount in the range of about 0.01% to about 20%, more preferably about 0.5% to about 5%, by weight, calculated as elemental rare earth, based on the catalyst after the present treating process.

The temperature of the rare earth metal contacting can vary widely. Preferred temperatures include those within the range of about 32 degrees F to about 300 degrees F, more preferably about 50 degrees F to about 200 degrees F. Performing this contacting at or about ambient temperature provides acceptable results. Contacting pressure is not narrowly critical, and more preferably is in the range of about 0.1 atmospheres to about 30 or more atmospheres. Performing this contacting at or about ambient or atmospheric pressure provides acceptable results. Rare earth metal ion contacting time also may vary widely. This contacting time is preferably in the range of about 1 minute to about 5 or more hours, more preferably about 5 minutes to about 2 hours. Such rare earth metal ion contacting, e.g., ion exchange, can be performed as a batch, semi-continuous or continuous operation in a column or other vessel.

As with the ammonium/catalyst contacting, any one of many well known ion exchange procedures or techniques may be utilized if ion exchange is desired during the rare earth metal ion/catalyst contacting. Such ion exchange is preferred. The ion exchange medium and conditions should be chosen to avoid unduly harming the catalyst. Temperature, pressure, pH and contact time conditions are preferably similar to those identified above. Care should be taken to avoid undue problems in separating the catalyst from the ion exchange medium. Such rare earth ion contacting, e.g., ion exchange, can be performed as a batch, semi-continuous or continuous operation in a column or other vessel. The catalyst is brought into contact with the ion exchange medium to effect the desired ion exchange. Any suitable ion exchange medium may be employed. Preferably, the ion exchange medium comprises an aqueous solution containing the desired rare earth metal ions to exchange rare earth metal ions on the catalyst.

After the rare earth metal ion/catalyst contacting, the catalyst can be filtered, washed, e.g., with an aqueous medium to remove extraneous ions and/or to adjust the rare earth metal content of the catalyst, and dried. At this point, the dried catalyst, including an increased concentration of rare earth metal, can be placed directly into hydrocarbon conversion service or can be calcined, preferably in air at a temperature of about 500 degrees F to about 1500 degrees F for a time of about 0.1 hours to about 12 hours or more, and then place into hydrocarbon conversion service. Alternately, the rare earth metal ion/catalayst contacting can be repeated, if necessary or desired to achieve still further benefits, e.g., further increased concentrations of rare earth metal on the catalyst.

The ammonium ion exchange and/or rare earth metal ion exchange embodiments of the present invention are of particular advantage when the catalyst comprises at least one synthetic crystalline material, e.g., zeolite, capable of promoting hydrocarbon conversion.

Although the ammonium ion contacting and rare earth metal ion contacting may occur simultaneously, preferably, if both contactings are to be employed, the contactings occur separately, more preferably with the ammonium ion contacting occurring prior to the rare earth metal ion contacting.

The composition of the catalysts to be treated in the present invention may vary widely, provided that such catalysts (without the metal contaminants) are capable of promoting the desired hydrocarbon conversion, the particular chemical make-up chosen being dependent, for example, on the type of hydrocarbon chemical conversion desired. Thus, the catalysts suitable for treatment in the present invention often comprise at least one of the natural or synthetic materials which are capable of promoting the desired hydrocarbon conversion. For example, when the desired hydrocarbon conversion involves one or more of hydrocarbon cracking (preferably in the substantial absence of added free molecular hydrogen), disproportionation, isomerization, hydrocracking, reforming, dehydrocyclization, polymerization, alkylation and dealkylation, such suitable materials include acid-treated natural clays, such as montmorillonite, kaolin and bentonite clays; natural or synthetic amorphous materials, such as alumina, silica, silica-alumina, silica-magnesia and silica-zirconia composites; and crystalline materials.

The catalyst composition to be treated in the present invention preferably comprise at least one synthetic crystalline material in an amount effective to promote the desired hydrocarbon conversion at hydrocarbon conversion conditions. Materials known as zeolites or molecular sieves are one preferred class of synthetic crystalline materials. Useful zeolites include not only synthetic zeolites, but also naturally occurring zeolites the chemical make-up of which is modified or changed to enhance one or more of the catalytic properties of the naturally occurring zeolites.

When the desired hydrocarbon conversion involves one or more of hydrocarbon cracking (preferably in the substantial absence of free molecular hydrogen), disproportionation, isomerization, hydrocracking, reforming, dehydrocyclization, polymerization, alkylation and dealkylation, the catalyst in one embodiment preferably comprises one or more synthetic crystalline material, such as aluminosilicates, SAPO, TAPO, MeAPO, AlPO, ZSM-series, LZ-Z10, LZ-10, USY and the like. Certain of these synthetic crystalline materials are discussed in U.S. Pat. Nos. 4,310,440; 4,440,871; 4,500,651; and 4,503,023. Of these, catalysts which include a catalytically effective amount of USY are particularly preferred.

Compositions of the catalysts which are particularly useful in the present invention are those in which the synthetic crystalline materials are incorporated in amounts effective to promote the desired hydrocarbon conversion, e.g., a catalytically effective amount, into a porous matrix which comprises, for example, amorphous material which may or may not be itself capable of promoting such hydrocarbon conversion. Included among such matrix materials are clays and amorphous compositions of alumina, silica, silica-alumina, magnesia, zirconia, mixtures of these and the like. The synthetic crystalline material is preferably incorporated into the matrix material in amounts within the range of about 1% to about 75%, more preferably about 2% to about 50%, by weight of the total catalyst. The preparation of crystalline-amorphous matrix catalytic materials is described in U.S. Pat. Nos. 3,140,253 and RE. 27,639. Catalytically active synthetic crystalline materials which are formed during and/or as part of the methods of manufacturing the catalyst are within the scope of the present invention.

The catalysts useful in the catalytic hydrocarbon cracking embodiment of the present invention may be any conventional catalyst capable of promoting hydrocarbon cracking at the conditions present in the reaction zone, i.e., hydrocarbon cracking conditions, and preferably, containing at least one of the above-noted synthetic crystalline materials. Similarly, the catalytic activity of such catalysts is restored at the conditions present in a conventional cracking unit regeneration zone. Typical among these conventional catalysts are those which comprise alumina, silica and/or silica-alumina, and preferably at least one synthetic crystalline material, e.g., aluminosilicate, having pore diameters of about 8 Angstroms to about 15 Angstroms and mixtures thereof. When the catalysts to be used in the hydrocarbon cracking embodiment of the present invention contain crystalline aluminosilicate, the crystalline aluminosilicate may, prior to the treating of the present invention, include minor amounts of conventional metal promoters such as the rare earth metals, in particular cerium.

As noted above, in one embodiment the metal contaminated catalyst is subjected to demetallization prior to step (1) and/or step (2) to reduce the amount of at least one contaminant metal on the catalyst. Various demetallizing process schemes are well known in the art. The exact demetallization method is a function of the metals level on the catalyst and the desired degree of metals removal sought. This demetallization can comprise simply regenerating the metal contaminated hydrocarbon conversion catalyst. Additional metals removal can be obtained through additional activation steps such as by first converting at least a portion of the metals to a metal-sulfur containing compound and then oxidizing and water washing the regenerated catalyst. This oxidation can be effected in either a liquid, e.g., aqueous, or gaseous medium or by other means known to those trained in the art such as illustrated in Anderson, U.S. Pat. Nos. 3,147,228 and 3,147,209 and Disegna et al, U.S. Pat. No. 3,252,918, each of which is incorporated in its entirety by reference herein.

If a portion of the metals are to be first converted to a metal-sulfur containing compound, this step can be performed by contacting the metal contaminated catalyst with elemental sulfur vapors, or more conveniently by contacting the poisoned catalyst with a volatile sulfide, (including one ore more components capable of generating volatile sulfide at the contacting conditions), such as $H_2S$, $CS_2$ or a mercaptan at an elevated temperature generally in the range of about 500 degrees to 1700 degrees F, preferably about 800 degrees to 1400 degrees F, and a sulfiding vapor partial pressure of about 0.05 to 30 atmospheres, or more preferably from about 0.2 to 25 atmospheres. Hydrogen sulfide is the preferred sulfiding agent. Pressures below atmospheric can be obtained either by using a partial vacuum or by diluting the vapor with a gas such as hydrogen or nitrogen. Particularly preferred are mixtures of hydrogen sulfide with hydrogen and/or carbon monoxide and/or carbon dioxide. The time of contact varies on the basis of the temperature and pressure chosen and other factors such as the amount of metal to be removed. Such contacting may run for up to about 20 hours or more, preferably about 0.25 hours to about 20 hours depending on the conditions and the severity of the poisoning. Temperatures of from about 900 degrees to about 1350 degrees F and pressures approximately 1 atmosphere or less are preferred. More preferably such contacting continues for at least about 1 to 2 hours but the time, of course, can depend upon the manner of contacting the catalyst system, e.g., batch or continuous, as well as the rate of diffusion within the catalyst matrix.

Exposure of the catalyst to oxidation temperature, preferably in the range of 525 degrees to 725 degrees F converts at least a portion of the sulfur-containing metal compounds on the catalyst to form a dispersible or removable by a subsequent washing step. Oxidation can be performed by either a gaseous or liquid phase oxidation to provide at least a portion of the metal poisons, e.g., nickel, vanadium and iron, in a readily removable, dispersible form. For example, one of the sulfur-containing metal compounds may be converted to the simple monosulfide or oxygenated sulfur salts. As used herein, "dispersible" is intended to include minute particle size material, as well as soluble and colloidal size particles.

The demetallization may make use of chlorination, preferably vapor phase chlorination, at moderately elevated temperatures up to about 700 degrees F. or even up to about 900 degrees F. or 1000 degrees F., wherein the catalyst composition and structure is not materially harmed by the treatment and a substantial amount, preferably at least about 30% and more preferably at least about 50%, of the contaminating or poisoning metals content is converted to chlorides. Such catalyst chlorination procedures are more fully described in U.S. Pat. Nos. 3,150,104; 3,122,510; 3,219,586; and 3,182,025 and commonly assigned, U.S. patent application Ser. No. 881334.

Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 degrees F. to about 1400 degrees F., more usually about 1000 degrees F. to about 1350 degrees F. Combustion of coke from the catalyst is rapid, and for reasons of economy only enough air is used to supply the needed oxygen. Average residence time for a portion of catalyst in the regenerator may be on the order of about a few minutes, e.g., about 5 minutes to about 10 minutes, and the oxygen content of the effluent gases from the regenerator may be less than about $\frac{1}{2}$% volume. When later oxygen treatment is employed in this invention, the regeneration of the catalyst is generally regulated to give a carbon content of less than about 0.5% by weight.

Treatment of the regenerated catalyst with molecular oxygen-containing gas to increase vanadium removal is preferably conducted at tempertures preferably above the temperature present in the catalyst regeneration zone, more preferably in the range of about 1000 degrees to 1800 degrees F. but below a temperature where the catalyst undergoes any substantial deleterious change in its physical or chemical characteristics. The catalyst is preferably in a substantially carbon-free condition during this high temperature treatment. If any significant amount of carbon is present in the catalyst at the start of this high-temperature treatment, the oxygen contact is preferably continued after carbon removal. In any event, after carbon removal, the oxygen treatment of the essentially carbon-free catalyst is preferably at least long enough to provide a substantial amount of vanadium in its highest valence state. The treatment of the catalyst with molecular oxygen-containing gas prior to the chlorination is preferably performed at a temperature at least about 50 degrees F. higher than the regeneration temperature. The duration of the oxygen treatment and the amount of vanadium prepared by the treatment for subsequent removal is dependent, for example, upon the temperature and the characteristics of the equipment used. The length of the oxygen treatment preferably is in the range of about a quarter of an hour to about four hours or more. The oxygen-containing gas used in the treatment preferably contains molecular oxygen and there is little significant consumption of oxygen in this treatment. The gas may be oxygen, or a mixture of oxygen with inert gas, such as air or oxygen-enriched air. The partial pressure of oxygen in the treating gas may range widely, for example, from about 0.1 to 30 atmospheres. The factors of time, partial pressure and extent of vanadium stabilization may be chosen with a view to the most economically feasible set of conditions. It is preferred to continue the oxygen treatment for at least about 15 or 30 minutes with a gas containing at least about 1% by volume, preferably at least about 10% by volume oxygen.

After converting at least a portion of the contaminant metal or metals on the catalyst to a water soluble or dispersible form, the catalyst is contacted or washed in a liquid aqueous composition to remove at least a portion of the contaminant metal or metals.

The water used is sometimes distilled or deionized prior to contact with the catalyst. However, the aqueous medium can contain extraneous ingredients in trace amounts, so long as the medium is aqueous-based and the extraneous ingredients do not interfere with demetallization or adversely affect the properties of the catalyst. Temperatures of about 150 degrees F. to the boiling point of water are helpful in increasing the solubility of the metal compounds, e.g., chlorides. Temperatures above 212 degrees F. and elevated pressures may be used but the results do not seem to justify the added equipment.

The initial liquid aqueous composition may be a reductive wash medium, which is preferably followed by an oxidative wash. These washes may be given alternately or several reductive washes may be followed by several oxidative washes. When alternating washes are used, the final wash is preferably an oxidative wash. As used herein, "reductive" wash refers to a wash with an aqueous solution containing a reducing agent or an agent which may give up electrons. Similarly, "oxidative" wash refers to a wash with an aqueous solution containing an oxidizing agent or an agent which may accept electrons. Moreover, "wash" refers to a treatment with the solution which may be accomplished by contacting the solid composition with the wash solution for a time sufficient to cause an interaction between the solution and solid composition thereby removing at least a portion of the metal poison. The contacting may be a batch operation, a semicontinuous operation or a continuous operation. Thus, a "wash" may include merely stirring in a batch vessel or a complex series of counter current contactors or continuous contactors. The reductive washes and oxidative washes useful in the present invention are more fully described in U.S. Pat. No. 4,101,444 and is commonly assigned, U.S. Patent application Ser. No. 881,334.

After the catalyst is washed, the catalyst slurry can be filtered to give a cake. The cake may be reslurried one or more times with water or rinsed in other ways, such as, for example, by a water wash of the filter cake.

If desired, additional metals removed may be obtained by repeating the demetallization step or using one or more other, e.g., known demetallization steps. Inert gases frequently may be employed after contact with reactive vapors to remove any of these vapors entrained in the catalyst or to purge the catalyst of reaction products.

After the washing and rinsing treatment which may be used in the preferred catalyst demetallization procedure, the catalyst is treated in accordance with step (1) and/or step (2) of the present invention, described previously. After step (1) and/or step (2), the treated solid composition is transferred to a hydrocarbon conversion system, for instance, to a catalyst regenerator. The catalyst may be returned as a slurry, or it may be desirable first to dry the treated catalyst, for example, at a temperature in the range of about 215 degrees F. to about 320 degrees F. Also, prior to using the treated catalyst in the hydrocarbon conversion operation it can be calcined, for example, at temperatures preferably in the range of about 700 degrees F. to about 1300 degrees F. Preferably, the treated catalyst is not calcined at a temperature higher than the temperature present during catalyst regeneration, e.g., in the catalyst regeneration zone, prior to using the treated catalyst in the hydrocarbon conversion operation. Such high temperature calcination has been found to reduce the catalytic effectiveness of the treated catalyst. The treated catalyst may be slurred with hydrocarbons and added to the reactor vessel, if desired.

The catalyst to be treated may be removed from the hydrocarbon conversion system—that is, the stream of catalyst which, in most conventional procedures, is cycled between conversion and regenerating operations—before the poison content reaches about 10,000 ppm., the poisoning metals, e.g., alkali metals, nickel, vanadium, iron, copper and mixtures thereof, being calculated as elemental metals.

The amount of alkali metals, nickel, vanadium, iron and/or copper removed or the proportions of each contaminant metal removed in practicing the procedures outlined or may be varied by proper choice of treating conditions. It may prove necessary, in the case of very severely poisoned catalyst, to repeat the treatment to reduce the metals to an acceptable level, perhaps with variations when one metal is greatly in excess. A further significant advantage of the process lies in the fact that the overall metals removal operation, even if repeated, does not unduly deleteriously affect the activity, selectivity, pore structure and other desirable characteristics of the catalyst. Preferably, the present catalyst treatment process, including one or more of the above-noted demetallization steps will provide greater than about a 50 weight % reduction in nickel, about 50 weight % reduction in vanadium and about 30 weight % reduction in iron. Such processing preferably provides about 70–90 weight % reduction in nickel, about 50–80 weight % reduction in vanadium and about 30–75 weight % reduction in iron when the catalyst initially contains as much as about 0.1 to 0.5 weight % nickel, about 0.3 to 1.0 weight % vanadium and about 0.2 to 1.2 weight % of iron.

In this invention the substantially hydrocarbon oils utilized as feedstock for a given conversion process may be of and desired type normally utilized in such hydrocarbon conversion operations. The feedstock may contain alkali metals nickel, iron, copper and/or vanadium as well as other metals. The catalysts may be used to promote the desired hydrocarbon conversion by employing at least one fixed bed, moving bed or fluidized bed (dense or dilute phase) of such catalyst. Bottoms from hydrocarbon processes, (i.e., reduced crude and residuum stocks) are particularly highly contaminated with these metals and therefore rapidly poison catalyst used in converting bottoms to more valuable products. For example, a bottom may contain about 100–1500 ppm Ni, about 100–2500 ppm V and about 100–3000 ppm Fe. For typical operations, the catalytic cracking of the hydrocarbon feed would result in a conversion of about 10 to 80% by volume of the feedstock into lower boiling, more valuable products.

The present invention is particularly suitable for treating catalysts utilized in the catalytic cracking of reduced or topped crude oils to more valuable products such as illustrated in U.S. Pat. Nos. 3,092,568 and 3,164,542, each of which patents is incorporated in its entirety herein by reference. Similarly, this invention is applicable to processing shale oils, tar sands oil, coal oils and the like where metal contamination of the processing, e.g., cracking catalyst can occur.

The following non-limiting examples illustrate certain aspects of the present invention.

EXAMPLES 1 to 24

A mass of commercial equibrium fluid catalytic cracking catalyst was obtained for testing. This catalyst was commercially manufactured and contained a catalytically effective amount of (a combination of) USY synthetic zeolite (and rare earth metal exchanged Y synthetic zeolite). The catalyst has been used in a commercial fluid bed catalytic cracking operation and included amounts of alkali metal, vanadium, iron and nickel from the catalytic cracking hydrocarbon feedstock which became associated with the catalyst when the catalyst was in the cracking reaction zone. The catalyst used in the testing was substantially carbon free.

Various portions of this catalyst were subjected to the one or more of the following procedures.

The following vessel was used in certain of the procedures. A two inch i.d. by eighteen inch long quartz vessel fitted with a coarse quartz frit was used as a reactor vessel. One inch i.d. by ten inch long extensions were positioned at either end of this reactor vessel and terminated in ball joints which allowed quick disconnecting of the entire assembly, if desired. Heat to the fluid bed reactor vessel was supplied by a Lindberg Model 54442-D furnace. Heat tracing of entry and exit gases was effected by external heat tape wrapping.

Procedure A

The catalyst was charged to this reactor vessel and fluidized with compressed air while heating to 1350 degrees F. Approximately two hours were needed for heating to operating temperature, including a fifteen minute period when the gas lines and the fluid bed were flushed with nitrogen before introducing H2S.

After this nitrogen flush, the catalyst bed was fluidized with 100% H2S for four hours. Following this sulfiding step, the reactor vessel and contents were cooled to 650 degrees F. under nitrogen fluidization. The catalyst bed was then fluidized with 100% chlorine gas for 90 minutes at 650 degrees F. Following the chlorination, the reactor was flushed with nitrogen for fifteen minutes while maintaining a temperature of about 650 degrees F. This nitrogen purge removed some chlorine from the void space in the catalyst bed and some volatile vanadium, and iron chlorine-containing components.

Procedure A (1)

The hot chlorinated catalyst was cooled to ambient temperature, i.e., about 70 degrees F., and contacted with a liquid water wash. The catalyst/water slurry was filtered on a Buchner funnel, and oven dried at 230 degrees F. overnight.

Procedure A (2)

The hot chlorinated catalyst was cooled to ambient temperature and contacted with a liquid water wash. The catalyst/water slurry was filtered on a Buchner funnel, reslurried again in water and refiltered on a Buchner funnel and oven dried at 230 degrees F overnight.

Procedure B

The catalyst was subjected to calcining at a temperature of 1330 degrees F. to 1350 degrees F. for 4 hours in an air atmosphere.

Procedure B (1)

The catalyst was subjected to calcining at a temperature of 1330 degrees F to 1350 degrees F for 4 hours in an air atmosphere. The catalyst was then washed with liquid water, filtered and oven dried at 230 degrees F overnight.

Procedure C

The catalyst was slurried with water and sufficient sulfur dioxide was added to give an initial pH of about 2.0. The temperature was maintained at about 70 degrees F for about 3 minutes. The catalyst was then filtered and the aqueous sulfur dioxide wash was repeated twice more to give a total of 3 reductive washes.

The catalyst was then slurried with water and $H_2O_2$ at a rate of about 10–40 pounds/ton of catalyst was added. The initial temperature was about 175 degrees F and the wash was carried out for 3 minutes. The $H_2O_2$ wash was repeated once more to give a total of two oxidative washes. The catalyst was then washed with water, filtered and then dried under a vacuum at about 230 degrees F overnight.

Procedure D

The catalyst is contacted with an aqueous solution of ammonium salt hydroxide at ambient temperature and at an initial pH of about 4 to 7. The weight ratio of catalyst to solution was about 1:4–20. The contacting continued for 1 hour. The catalyst was then filtered, washed with water and refiltered. The catalyst is then oven dried at 230 degrees F overnight.

Procedure E

The catalyst is contacted with an aqueous solution of rare earth (mainly cerium and lanthanum) salts at ambient temperature and at an initial pH of about 1–2. The amount of rare earth metal in the solution was about 10–30% by weight. The weight ratio of catalyst to solution was about 1:4–20. The contacting continued for 1 hour with agitation. The catalyst was then filtered, washed with water and refiltered. The catalyst is then oven dried at 230 degrees F. overnight.

Procedure F

The catalyst (in the above-noted vessel) was heated to 1350 degrees F. with an accompanying nitrogen purge. After this purge, the catalyst bed was fluidized with 100% H2S for four hours. Following this sulfiding step, the reactor vessel and contents were cooled to 600 degrees F. under nitrogen fluidization. The nitrogen was then turned off and air was introduced into the bed to fluidize the catalyst. An exotherm occurred raising the temperature to between 630 degrees F. to 680 degrees F. This air contacting occurred for about 25 minutes. The catalyst was then cooled under nitrogen flow.

The original, untreated catalyst and various treated catalysts were each tested for catalytic activity using the Micro Activity Test (ASTM D 3907-80). Results of these tests are shown in Table 1. In addition, a selected number of these catalysts were analyzed for metal contents to determine the extent of metal removal. These results are shown in Table 2.

TABLE 1

| Example | Treatment[1] | MAT No. | Gasoline, wt % | Coke Factor | Gas Factor |
|---|---|---|---|---|---|
| 1 | None | 65.2 | 46.8 | 3.0 | 1.1 |
| 2 | A,A[1] | 67.6 | 47.2 | 2.4 | 1.2 |
| 3 | A,A[2] | 66.3 | 46.4 | 2.6 | 1.2 |
| 4 | B,A,A[1] | 70.0 | 48.7 | 2.3 | 1.2 |
| 5 | B,A,A[2] | 71.5 | 49.8 | 2.3 | 1.2 |
| 6 | B,A,A[2],C | 72.2 | 50.7 | 1.5 | 1.2 |
| 7 | B,A,A[2],D,B | 70.4 | 47.5 | 2.6 | 1.2 |
| 8 | B,A,A[2],E | 69.7 | 49.0 | 2.1 | 1.2 |
| 9 | B,A,A[2],C,D,B | 75.2 | 50.3 | 1.7 | 1.3 |
| 10 | B,A,A[2],C,E | 71.9 | 50.1 | 1.7 | 1.2 |
| 11 | B,A,A[2],D,B,E | 70.6 | 47.6 | 2.3 | 1.3 |
| 12 | F,C[2] | 66.5 | 45.0 | 3.2 | 1.3 |
| 13 | F,C[3] | 53.8 | 37.8 | 3.9 | 1.2 |
| 14 | F,C[2],D,B | 70.5 | 48.0 | 2.4 | 1.2 |
| 15 | F,C[2],E | 73.0 | 51.2 | 1.9 | 1.1 |
| 16 | F,C[2],D,B,E | 76.2 | 53.2 | 1.5 | 1.1 |
| 17 | B[1] | 60.3 | 41.4 | 3.9 | 1.3 |
| 18 | B[1],D,B | 69.1 | 46.2 | 2.8 | 1.3 |
| 19 | B[1],E | 69.1 | 47.2 | 2.3 | 1.3 |
| 20 | B[1],C[4] | 70.4 | 47.2 | 2.4 | 1.3 |
| 21 | B[1],D,B,E | 70.6 | 46.7 | 2.5 | 1.3 |
| 22 | B[1],C[4],D,B | 69.7 | 47.4 | 2.5 | 1.3 |
| 23 | B[1],C[4],E | 71.0 | 49.0 | 1.8 | 1.2 |
| 24 | B[1],C[4],D,B,E | 69.7 | 48.2 | 2.0 | 1.3 |

[1] Each of the portions of the catalyst except the untreated catalyst was treated to one or more of the procedures in the sequence shown.
[2] No water wash after the $H_2O_2$ wash.
[3] Use 80% $H_2S$ and 20% $H_2$ instead of 100% $H_2S$, and no water wash after the $H_2O_2$ wash.
[4] Procedure C did not include the $H_2O_2$ wash, the reductively washed catalyst was washed with water and dried.

TABLE 2

| | % Metals Removal | | |
|---|---|---|---|
| Example | Vanadium | Nickel | Iron |
| 1 | 0 | 0 | 0 |
| 6 | 40.0 | 88.5 | 62.9 |
| 12 | 36.0 | 80.6 | 38.6 |
| 20 | 30.8 | 4.8 | 0.7 |

Each of the catalysts which was subjected to Procedure E included between 0.2% to about 2% by weight additional rare earth metal, calculated as elemental metal, relative to the untreated catalyst (Example 1).

The results show clearly that the use of ammonium ion and/or rare earth ion contacting in an overall catalyst demetallization process provides outstanding benefits. Improved MAT numbers (conversion) and gasoline yields are obtained, while coke and gas producing factors are advantageously reduced. For example, compare Example 5 with Examples 7 and 8; Example 6 with Examples 9 and 10; Example 12 with Examples 14 and 15 and Example 17 with Examples 18 and 19.

EXAMPLES 25 to 38

Catalysts treated in accordance with procedures described in Examples 7 to 11, 14 to 16, 18, 19 and 21 to 24 are included in the circulating catalyst inventory of a commercial fluid bed catalytic cracking unit processing substantially hydrocarbon gas oil. Over a period of time, it is determined that all the catalysts perform satisfactorily in this commercial operation.

While this invention has been described with respect to various specific examples and embodiments, it is to be understood that the invention is not limited thereto and that it can be practiced within the scope of the following claims.

We claim:

1. A process for treating a catalyst contaminated with at least one metal which was so contaminated while promoting cracking, in the substantial absence of added molecular hydrogen, of a hydrocarbon feedstock containing said metal, said catalyst comprising at least one synthetic crystalline material capable of promoting said conversion, said process comprising:
   demetallizing said catalyst to reduce the amount of said metal on said catalyst and produce a demetallized catalyst; and at least one of the following:
   (1) contacting said demetallized catalyst with ammonium ions to increase the ammonium ion content of said demetallized catalyst; and
   (2) contacting said demetallized catalyst with rare earth metal ions to increase the rare earth metal ion content of said demetallized catalyst.

2. The process of claim 1 wherein both steps (1) and (2) take place and step (1) takes place before step (2).

3. The process of claim 1 where said synthetic crystalline material comprises at least one zeolite, and said contaminant metal is selected from the group consisting of alkali metals, vanadium, nickel, iron, copper and mixtures thereof.

4. The process of claim 1 wherein said demetallization comprises contacting said catalyst at elevated temperature with at least one chlorine-containing component to form a chlorinated catalyst and contacting said chlorinated catalyst with at least one liquid aqueous composition to produce a catalyst having a reduced amount of said metal.

5. The process of claim 2 wherein said demetallization comprises contacting said catalyst at elevated temperature with at least one chlorine-containing component to form a chlorinated catalyst and contacting said chlorinated catalyst with at least one liquid aqueous composition to produce a catalyst having a reduced amount of said metal.

6. The process of claim 1 wherein said demetallization comprises contacting said catalyst with at least one sulfur-containing component to convert at least a portion of said metal to a metal, sulfur-containing compound; contacting said catalyst containing said metal, sulfur-containing compound with at least one oxidizing agent to convert at least a portion of said metal, sulfur-containing compound so that at least a portion of said metal is in a dispersible form; and contacting said catalyst containing said metal in dispersible form with an aqueous composition to produce a catalyst having a reduced amount of said metal.

7. The process of claim 2 wherein said demetallization comprises contacting said catalyst with at least one sulfur-containing component to convert at least a portion of said metal to a metal, sulfur-containing compound; contacting said catalyst containing said metal, sulfur-containing compound with at least one oxidizing agent to convert at least a portion of said metal, sulfur-containing compound so that at least a portion of said metal is in a dispersible form; and contacting said catalyst containing said metal in dispersible form with an aqueous composition to produce a catalyst having a reduced amount of said metal.

8. The process of claim 1 wherein said demetallization comprises contacting said catalyst with a liquid, aqueous medium to produce a demetallized catalyst having a reduced amount of said metal.

9. The process of claim 2 wherein said demetallization comprises contacting said catalyst with a liquid, aqueous medium to produce a catalyst having a reduced amount of said metal.

10. The process of claim 8 wherein said metal is vanadium and said catalyst is contacted with an oxygen-containing gaseous medium at a temperature in excess of the temperature of said hydrocarbon conversion to enhance vanadium removal from said catalyst prior to said catalyst being contacted with said aqueous liquid medium.

11. The process of claim 9 wherein said metal is vanadium and said catalyst is contacted with an oxygen-containing gaseous medium at a temperature in excess of the temperature of said hydrocarbon conversion to enhance vanadium removal from said catalyst prior to said catalyst being contacted with said aqueous liquid medium.

12. The process of claim 1 wherein said demetallization comprises (A) contacting said catalyst with a liquid reductive work medium; and (B) subsequently contacting the reductively washed catalyst with a liquid oxidative wash medium.

13. The process of claim 2 wherein said demetallization comprises (A) contacting said catalyst with a liquid reductive wash medium; and (B) subsequently contacting the reductively washed catalyst with a liquid oxidative wash medium, steps (A) and (B) reducing the content of said metal on said catalyst.

14. The process of claim 1 wherein step (1) is carried out at conditions to ion exchange ammonium ions onto said demetallized catalyst and step (2) is carried out at conditions to ion exchange rare earth metal ions onto said demetallized catalyst.

15. The process of claim 2 wherein step (1) is carried out at condition to ion exchange ammonium ion onto said demetallized catalyst and step (2) is carried out at conditions to ion exchange rare earth metal ions onto said demetallized catalyst.

16. The process of claim 1 wherein said rare earth metal is cerium.

17. The process of claim 2 wherein said rare earth metal is cerium.

* * * * *